United States Patent [19]

Malikov et al.

[11] 4,339,010
[45] Jul. 13, 1982

[54] APPARATUS FOR WEIGHING TRANSPORT VEHICLES IN MOTION

[76] Inventors: Georgy F. Malikov, Khlebozavodskoi proezd, 8, korpus 1, kv. 56; Vladimir A. Chukhno, 3 Paveletsky proezd, 7, kv. 45; Leonid K. Timofeev, 2 ulitsa Bebelya, 26, kv. 152, all of Moscow, U.S.S.R.; Khakim N. Ibragimov, deceased, late of Moscow, U.S.S.R.; by Maria F. Ibragimova, administrator, Svobodny prospekt, 5/2, kv. 134, Moscow, U.S.S.R.

[21] Appl. No.: 221,995

[22] Filed: Jan. 2, 1981

[51] Int. Cl.³ ............... G01G 19/02; G01G 3/08; G01G 21/24

[52] U.S. Cl. ............... 177/134; 177/229; 177/255

[58] Field of Search .............. 177/2, 134, 229, 255

[56] References Cited

U.S. PATENT DOCUMENTS

| 3,057,422 | 10/1962 | Cunningham et al. | 177/2 X |
| 3,092,195 | 6/1963 | Von Petery | 177/229 X |
| 3,142,349 | 7/1964 | Blodgett | 177/229 X |
| 3,658,143 | 4/1972 | Schwartz | 177/229 X |
| 3,747,715 | 7/1973 | Nordstrom . | |
| 3,889,768 | 6/1975 | Hejzlar | 177/229 |
| 4,261,428 | 4/1981 | Bradley | 177/255 X |
| 4,300,648 | 11/1981 | Gallo et al. | 177/229 |

FOREIGN PATENT DOCUMENTS 356815 4/1973 Sweden .
236051 6/1969 U.S.S.R. .

Primary Examiner—George H. Miller, Jr.
Attorney, Agent, or Firm—Fleit & Jacobson

[57] ABSTRACT

An apparatus for weighing transport vehicles in motion, wherein at least two measuring units are electrically connected with a recording unit, each comprising a load platform which bears on a dynamometric pickup load cell at a supporting point and is connected to a supporting structure by means of four rods installed in pairs at two sides of said load platforms, directed to one end thereof and secured at one end on said supporting structure and at the other end on the side surfaces of the load platform in immediate proximity to the geometric line which is a projection of the vertical line through the supporting point of said platform onto the respective side thereof, said load platform bearing on the load cell at a geometric point whose vertical displacement due to an arbitrary moment of forces acting upon the load platform and causing elastic deformation of the rods is equal to zero.

3 Claims, 4 Drawing Figures

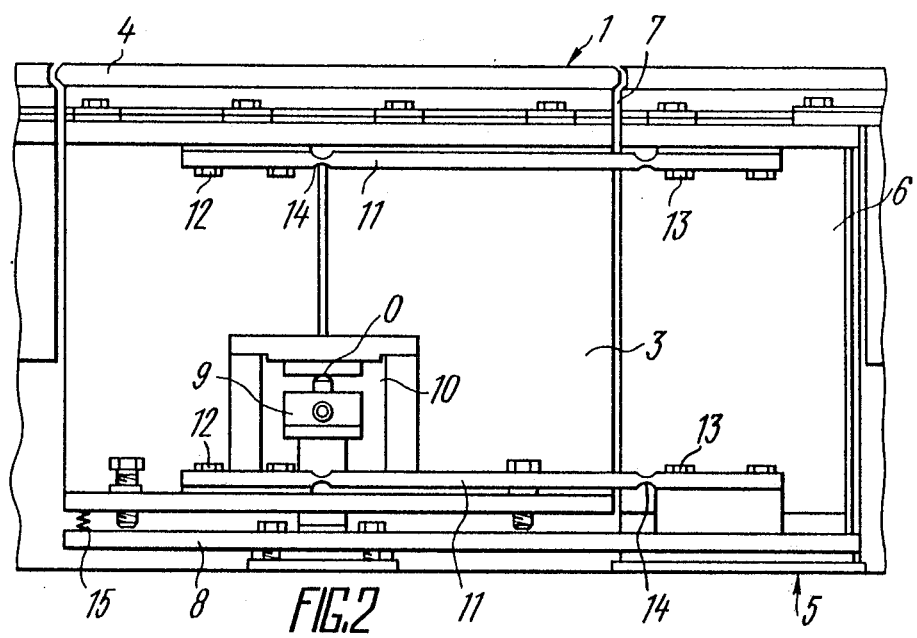

APPARATUS FOR WEIGHING TRANSPORT VEHICLES IN MOTION

TECHNICAL FIELD

The present invention relates to measuring facilities and has particular reference to apparatus for measuring mass, more specifically, to apparatus for weighing transport vehicles in motion.

The proposed apparatus for weighing transport vehicles in motion is designed primarily for use at railroad stations, industrial sidings and sea or river ports where it may give the advantage of weighing railroad cars without stopping and uncoupling trains. The invention may also be used for weighing motor vehicles.

The principal feature of apparatus for weighing transport vehicles in motion is that weighing is performed when two axle wheels of the railroad car are running on the load platform of the apparatus. Hence, the main requirement of such apparatus is that their readings must be independent of the location of the axle wheels on the load platform, i.e. the place of load application. There are also other sources of errors that affect weighing in motion, for example, dynamic loading due to oscillation of the railroad cars and the load platform, changes in traction resistance, retardation of the cars in the process of weighing. In the weighing apparatus employing load cells, the aforesaid disadvantages are lessened by recourse to a special processing of the load cell signal. In this case the accuracy of measurement increases with increase in the duration of signal processing, i.e. in the length of the load platform. Thus when weighing transport vehicles in motion the attainment of the apparatus readings independent of the place of load application is complicated since the length of the load platform has to be increased to a maximum in the direction of travel of the vehicle being weighed, as is the case, for example, in the apparatus whereby weighing of railroad cars is performed axle by axle, the length of the load platform being limited by the distance between the car axles.

In setting up and adjusting apparatus for weighing transport vehicles in motion, it is essential for accurate measurement of mass to ensure that their readings are independent of the place of load application. This is accomplished through a complicated and labor-consuming operation which would be materially simplified if the design of the apparatus enabled it to be carried out at the factory, the apparatus being assembled and adjusted before shipment.

Known in the art is an apparatus for weighing transport vehicles in motion (refer to Swedish Pat. No. 356815 published June 4, 1973, cl. G01g 19/04) which comprises two measuring units electrically connected with a recording unit. The load platform of each measuring unit bears on two load cells located at the platform ends. The load platforms of the measuring units are interconnected by means of cross ties of low torsional rigidity.

In this apparatus, the magnitude of the output signal of the dynamometric pickups depends on the position of the wheels on the load platform. To render the apparatus readings independent of the position of the wheels on the load platform, equal amplification coefficients are introduced in all the channels of processing the output signals of the dynamometric pickups. However, independent loading of the load cells cannot be obtained in this apparatus. In carrying out adjustments and metrological certification, this disadvantage presents substantial difficulties in obtaining readings independent of the position of standard weights, the accuracy of the apparatus being adversely affected.

Another disadvantage which substantially affects the accuracy of the apparatus is that each load cell operates in the full load range, whilst the load remains invariable in the measuring process. Moreover, the load cells operate in the full load range even when the range of the loads being measured is narrow as is the case with the railroad transport.

Also known in the art is an apparatus for weighing transport vehicles in motion (refer to U.S.S.R. Inventor's Certificate No. 236051 dated September 19, 1966, cl. G01 g 19/02), wherein a load platform bears on a linkage whose output member is connected with a load cell. In this apparatus, readings are rendered independent of the place of load application by virtue of equality of leverage. Inasmuch as the output signal of the load cell in this apparatus is independent of the wheel position on the load platform, the operating range of the dynamometric pickup corresponds to the range of load measurement, more specifically, if the range of the external load is narrow, the load cell operates in a narrow range.

However, the employment of a linkage renders this apparatus cumbersome and unfit for shipping completely assembled. Another disadvantage of this apparatus is that, owing to low rigidity of the linkage, the load platform yields under the wheels, whereby the dynamic error of measurement is increased.

Also known in the art is an apparatus for weighing transport vehicles in motion (refer to U.S. Pat. No. 3747715, published in 1973, class 177-1), wherein at least two measuring units are electrically connected with a recording unit, each comprising a load platform which bears on a load cell at a supporting point and is connected to a supporting structure by means of horizontal elastic members whose rigidity is substantially greater in a horizontal direction than in a vertical direction, said members being connected with the supporting structure and the load platform in such a manner as to form, in conjunction therewith, a parallelogram. In this apparatus, the load cell is located at the center of the load platform and the elastic members are situated at the two ends of that load platform.

For higher accuracy of measurement, the elastic members and the load platform form a continuous surface and are designed for the wheels of the transport vehicle to move thereon. The readings of the apparatus are taken to be independent of the wheel position on the load platform on the assumption of "ideal" properties of the elastic parallelogram formed by the elastic members in conjunction with the supporting structure and the load platform and of absolute symmetry of the measuring unit, in particular with reference to the load cell being located strictly on the axis of symmetry.

Practically, this elastic parallelogram is not ideal, since the elastic members have ultimate rigidity in tension-compression and rise is given to forces and moments in the elastic joints. Furthermore, unavoidable inaccuracy of manufacture upsets the symmetry of the measuring unit. For these reasons, the readings of the apparatus are influenced by the wheel position on the load platform. One more disadvantage of this apparatus is that the length of the load platform, i.e. the distance over which measurement is performed, is substantially reduced, since the provision of a continuous surface for the wheels to roll upon results in that the wheels roll on the elastic members. In considering this condition, let the length of the load platform=b, the distance between the wheel axes=a, and the length of the elastic members=c. The longest measuring time is attained at a=b. To provide a continuous surface, we have b=a−2c. Thus the length of the load platform over which measurement is performed is reduced by twice the length of the elastic members. For the elastic members to possess sufficient strength with low rigidity, said members have to be substantially long, the length of the load platform and, consequently, the duration of measurement being essentially reduced, adding to the error of measurement.

In order to provide a continuous surface for the wheels to roll upon, the elastic members are positioned at both ends of the load platform, whereby surplus connections are introduced in the system of the elastic members, said system becoming a statically indeterminate structure. This condition results in added errors of measurement due to temperature fluctuation and inaccuracy of manufacture and installation of the elastic members. All these disadvantages render the apparatus under consideration practically unfit for proper functioning.

To raise the accuracy of an apparatus for weighing transport vehicles in motion, it is not sufficient to make the readings of the apparatus free from the influence of the place of load application to the load platform, but it is necessary to ensure that the magnitude of the output signal of the load cell is independent of the place of load application.

To facilitate adjustments, the measuring units should be constructed so that the load cells can be loaded independently by placing standard weights on the load platform.

DISCLOSURE OF THE INVENTION

It is an object of the present invention to provide an apparatus for weighing transport vehicles in motion, said apparatus being capable of measuring mass with high accuracy.

It is another object of the present invention to provide an apparatus for weighing transport vehicles in motion, said apparatus requiring no adjustment at the erection thereof in the place of installation.

These objects are achieved in an apparatus for weighing transport vehicles in motion, wherein at least two measuring units are electrically connected with a recording unit, each comprising a load platform which bears on a load cell at a supporting point and is connected to a supporting structure by means of horizontal elastic members whose rigidity is substantially greater in a horizontal direction than in a vertical direction, said members being connected with the supporting structure and the load platform in such a manner as to form, in conjunction therewith, a parallelogram. According to the invention, the apparatus comprises four elastic members constructed as rods installed in pairs at two sides of the load platform, directed to the end thereof and secured at one end on the supporting structure and at the other end on the side surfaces of the load platform in immediate proximity to the geometric line which is a projection of the vertical line through the supporting point of the load platform onto the respective side surface thereof, said load platform bearing on the load cell at a geometric point whose vertical displacement due to an arbitrary moment of forces acting upon the load platform and causing elastic deformation of the rods is equal to zero.

It is desirable that in the apparatus for weighing transport vehicles in motion each measuring unit should comprise a spring installed between the load platform and the horizontal part of the supporting structure and adapted to be moved on the surface of the supporting structure with respect to the supporting point of the load platform for that supporting point to coincide with the load platform geometric point whose vertical movement due to an arbitrary moment of forces acting upon the load platform and causing elastic deformation of the rods is equal to zero.

It is further desirable that in the apparatus for weighing transport vehicles in motion the load cell should be mounted on the surface of the supporting structure movably with respect to the load platform geometric point whose vertical displacement due to an arbitrary moment of forces acting upon the load platform and causing elastic deformation of the rods is equal to zero.

This construction of the apparatus for weighing transport vehicles in motion provides for substantially raising the accuracy of measuring mass. In carrying out adjustments and metrological certification of the apparatus, the load cell of each measuring unit are loaded with standard weights independently of each other and the output signal of the pickups is not influenced by the place of load application, remaining constant throughout the measuring process to an accuracy equal to the magnitude of dynamic disturbance.

Thus, if the range of external loads is narrow, the dynamometric pickup operates in a narrow range.

The construction of the apparatus according to the invention provides for industrial production of such apparatus, the latter being completed both structurally and metrologically so that they are fit for certification at the manufacturer's. By locating the rods on one side with respect to the load cell, measurement errors due to temperature fluctuations are eliminated. Attaching the rods to the load platform at the points disclosed herein provides against abrupt non-linearity of the experimental curve plotted in loading the measuring units with standard weights. Such an apparatus can be readily mounted on a foundation built beforehand, time and labor being saved.

BRIEF DESCRIPTION OF THE DRAWINGS

The invention will now be more particularly described by way of example with reference to the accompanying drawings, wherein:

FIG. 2 is a general view of the measuring unit of the apparatus for weighing transport vehicles in motion, according to the invention;

Figure 1:
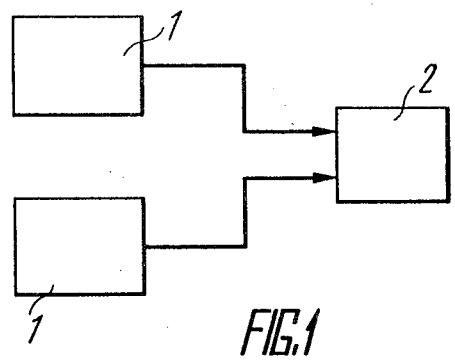
FIG. 1 is a block diagram of the apparatus for weighing transport vehicles in motion, according to the invention.

The embodiment of the apparatus described herein is designed for weighing railroad cars in motion. The apparatus comprises at least two measuring units 1 (FIG. 1) electrically connected with a recording unit 2. A further quantity of the measuring units 1 may be used, depending on the required accuracy of measurement. Each measuring unit 1 comprises a load platform 3 (FIG. 2) constructed as an I-beam on which is mounted a length of a rail 4. The load platform 3 is connected with a supporting structure 5 which has a stay 6 separated from the load platform 3 by a gap 7. The supporting structure 5 further has a plate 8 which mounts a load cell 9 the function of which may be performed, for example, by a strain gauge. The dynamometric pickup 9 is located in an aperture 10 which is provided in the lower middle part of the load platform 3. The load platform 3 bears on the dynamometric pickup 9 at a point 0. The load platform 3 is connected to the stay 6 by means of four rods 11 installed in pairs at two sides of the load platform 3. At one end the rods 11 are secured with bolts 12 to the side surfaces of the load platform 3 in immediate proximity to the geometric line which is a projection of the vertical line through the point 0 onto the respective side surface of the load platform 3. At the other end the rods 11 are secured to the stay 6 with bolts 13. The rods 11 are positioned horizontally and parallel to one another. Two of them are installed at the top of the load platform 3 and the other two at the bottom thereof. The rods 11 are of rectangular cross section, their rigidity is substantially greater in a horizontal direction than in a vertical direction. In conjunction with the load platform 3 and the stay 6, the rods 11 form an elastic parallelogram. The rods 11 have elastic necks 14 which are provided in immediate proximity to the points of rod attachment. The elastic necks 14 provided in immediate proximity to the points at which the rods 11 are secured to the load platform 3 are located on the vertical line which is a projection of the vertical line through the supporting point 0 of the load platform 3 onto the respective surface thereof. Such an arrangement of the elastic necks 14 provides against abrupt changes in the experimental curve plotted in loading the load platform 3 with standard weights.

The supporting point 0 of the load platform 3 is a point whose vertical displacement due to an arbitrary moment of forces acting upon the load platform 3 and causing elastic deformation of the rods 11 is equal to zero, owing to which the output signal of the load cell 9 is independent of the position of the load on the load platform 3. To provide this condition, a spring 15 is installed between the load platform 3 and the plate 8 at the end of the load platform 3 remote from the stay 6. The spring 15 is mounted movably with respect to the point 0 and is fixed in the position which provides coincidence of the supporting point of the load platform 3 with the geometric point thereof whose vertical displacement due to an arbitrary moment of forces acting upon the load platform 3 and causing elastic deformation of the rods 11 is equal to zero.

Figure 3A:
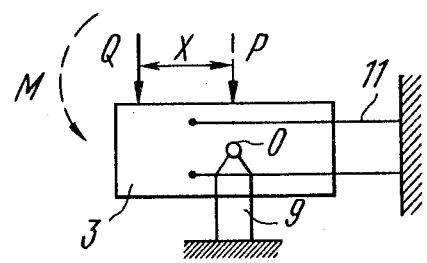
FIG. 3 diagrammatically discloses interaction between the load cell and the load platform when the latter is acted upon by a load.
Figure 3B:
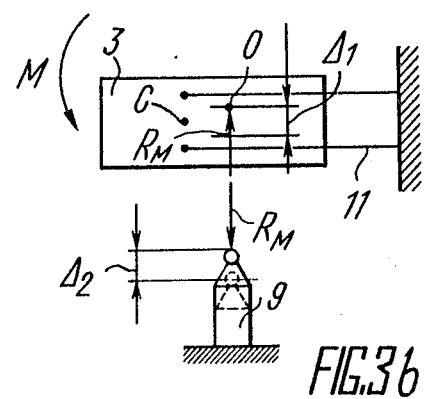

FIG. 3 explains the essentials of the conditions which make the output signal of the load cell 9 independent of the place of load application to the load platform 3. Considering the load platform 3 absolutely rigid, replace the load Q (FIG. 3a), which is applied at the distance X from the supporting point 0 of the load platform 3, by the force P applied to the load cell 9 at the supporting point 0 and by the moment $M = PX$. Using the principle of superposition, we may consider that the force R taken by the load cell 9 is $R = R_p + R_M$, where $R_p$ is the component produced by the force P and $R_M$ is the component produced by the moment M. Since $R_p$=const (a constant value), it will suffice to consider the variable component $R_M = R_M(X)$ which is a function of the coordinate X of the point of load application. To determine $R_M$ (FIG. 3b), disintegrate the system. $R_M$ is found from the joint movements $\Delta_1 = \Delta_2$, where $\Delta_1$ is the displacement of the load platform 3 at the supporting point of the load cell 9 under the action of the force $R_M$ and the moment M causing elastic deformation of the rods 11, and $\Delta_2$ is the displacement of the pickup 9 under the action of the force $R_M$. Let the point C be the point whose displacement equals zero, the load platform 3 turning about this point under the action of the moment M due to deformation of the rods 11. If the supporting point 0 of the load platform 3 is set to coincide with the point C, then $\Delta_2 = 0$ and it follows from the condition of the joint movement that $R_M = 0$ and $R = R_p$=const, i.e. the force of the load cell 9 and, consequently, the output signal thereof are independent of X. The value $R = p\ C_2/C_2 + C_3)$, where $C_2$ is the rigidity of the load cell 9 and $C_3$ is the total rigidity of the four rods 11.

In practice, to render the output signal of the load cell 9 independent of the place of application of the load Q when making adjustments, the platform 3 is loaded by placing standard weights on the ends thereof and the load cell 9 is moved until the output signal thereof becomes constant.

The output signal of the load cell 9 can also be rendered independent of the place of load application by moving the spring 15 (FIG. 2) along the load platform 3. To carry out this adjustment, standard weights having, for example, mass P are placed at the opposite sides of the supporting point 0 of the load platform 3 and the spring 15 is moved with respect to the point 0 so as to have equal readings in the recording unit 2 (FIG. 1). When this condition is obtained, the spring 15 is fixed in position by any conventional method.

The apparatus for weighing transport vehicles in motion operates as follows:

When the railroad car wheel bears on the respective load platform 3 (FIG. 2), the load cell 9 produces a signal proportional to the load being measured. The constructional feature of the measuring unit 1 ensures that the load platform 3 transmits a constant force to the load cell 9 as long as the wheel is on the load platform. The output signals of the load cell 9 are processed in the recording unit 2. The measurements taken by each measuring unit 1 are summed up and recorded in an appropriate manner.

What is claimed is:

1. An apparatus for weighing transport vehicles in motion, wherein at least two measuring units are electrically connected with a recording unit, each including:
    a supporting structure;
    a load cell mounted on said supporting structure;
    a load platform bearing on said load cell at a supporting point;
    four horizontal rods installed in pairs at two sides of the load platform, directed to one end thereof and secured at one end on said supporting structure and at the other end of the side surfaces of said load platform in immediate proximity to the geometric line which is a projection of the vertical line through the supporting point of said load platform;
    said rods featuring rigidity which is substantially greater in a horizontal direction than in a vertical direction;
    said rods being connected with said supporting structure and said load platform in such a manner as to form, in conjunction therewith, an elastic parallelogram;
    said load platform bearing on said load cell at a geometric point whose vertical displacement due to an arbitrary moment of forces acting upon the load platform and causing elastic deformation of the rods is equal to zero.

2. An apparatus for weighing transport vehicles in motion, as claimed in claim 1, wherein each of said measuring units further includes:

a spring installed between said load platform and said supporting structure and adapted to be moved on the surface of said supporting structure with respect to the supporting point of said load platform for said supporting point to coincide with the load platform geometric point whose vertical displacement due to an arbitrary moment of forces acting upon said load platform and causing elastic deformation of said rods is equal to zero.

3. An apparatus for weighing transport vehicles in motion, as claimed in claim 1, including:

said load cell mounted on the surface of said supporting structure movably with respect to the load platform geometric point whose vertical displacement due to an arbitrary moment of forces acting upon said load platform and causing elastic deformation of said rods is equal to zero.

* * * * *